(12) United States Patent
Garcia Leiceaga et al.

(10) Patent No.: US 9,229,910 B2
(45) Date of Patent: Jan. 5, 2016

(54) PREDICTING THREE DIMENSIONAL DISTRIBUTION OF RESERVOIR PRODUCTION CAPACITY

(71) Applicant: Schlumberger Technology Corporation, Sugar Land, TX (US)

(72) Inventors: Gorka Garcia Leiceaga, Houston, TX (US); Joel Herve Le Calvez, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 467 days.

(21) Appl. No.: 13/787,059

(22) Filed: Mar. 6, 2013

(65) Prior Publication Data

US 2014/0121980 A1    May 1, 2014

Related U.S. Application Data (60) Provisional application No. 61/719,002, filed on Oct. 26, 2012.

(51) Int. Cl.

| | |
|---|---|
| G06F 17/18 | (2006.01) |
| G06F 17/00 | (2006.01) |
| G01V 9/00 | (2006.01) |
| G01V 1/28 | (2006.01) |
| E21B 49/00 | (2006.01) |
| G01V 1/30 | (2006.01) |

(52) U.S. Cl.
CPC ............... *G06F 17/18* (2013.01); *E21B 49/00* (2013.01); *G01V 1/284* (2013.01); *G01V 1/306* (2013.01)

(58) Field of Classification Search
CPC ......... G06F 17/18; E21B 49/00; G01V 1/306; G01V 1/284

USPC .................... 702/11, 13; 703/2, 10
See application file for complete search history.

(56) References Cited

U.S. PATENT DOCUMENTS

| | | | | |
|---|---|---|---|---|
| 6,549,879 | B1* | 4/2003 | Cullick | E21B 49/00 702/11 |
| 8,731,889 | B2* | 5/2014 | Du | E21B 43/267 703/10 |
| 8,862,450 | B2* | 10/2014 | Derfoul | E21B 43/00 703/10 |
| 2011/0257944 | A1* | 10/2011 | Du | E21B 43/267 703/2 |
| 2013/0325349 | A1* | 12/2013 | Bunting | G01V 9/00 702/11 |

OTHER PUBLICATIONS

Avseth, P. et al., "Quantitative Seismic Interpretation: Applying Rock Physics Tools to Reduce Interpretation Risk," pp. 147-159, Cambridge University Press, 2005.

* cited by examiner

*Primary Examiner* — Carol S Tsai
(74) *Attorney, Agent, or Firm* — Gary Gex (57) ABSTRACT

A method for evaluating portions of a reservoir includes classifying producing reservoir portions in the reservoir into multiple classifications based on production data associated with the producing reservoir portions. Each classification corresponds to a range of the production data. The method further includes generating a correlation between the classifications of the producing reservoir portions to a petrophysical property and elastic property of the subterranean formation, generating, based on the correlation, a spatial distribution function of reservoir quality to represent predicted classifications as a function of physical locations in the reservoir, and evaluating, using the spatial distribution function, a physical location in the reservoir for reservoir quality.

24 Claims, 8 Drawing Sheets

PREDICTING THREE DIMENSIONAL DISTRIBUTION OF RESERVOIR PRODUCTION CAPACITY

CROSS REFERENCE TO RELATED APPLICATIONS

This application claims priority under 35 U.S.C. §119 from Provisional Patent Application No. 61/719,002 filed Oct. 26, 2012, with common inventors.

BACKGROUND

Operations, such as geophysical surveying, drilling, logging, well completion, and production, may be performed to locate and gather valuable downhole fluids. Surveys are often performed using acquisition methodologies, such as seismic mapping, resistivity mapping, etc. to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities for extracting them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

A common approach used by engineers, petrophysicists, and some earth scientists to determine drilling sites is based on Poisson's ratio of the rock. The common belief is that a low Poisson's ratio corresponds to rocks that are easily hydraulically fractured and, therefore, is a good indication of a potentially productive wellsite where hydraulic stimulation treatment is relatively efficient.

SUMMARY

In general, in one aspect, embodiments relate to a method for evaluating portions of a reservoir. The method includes classifying, by a computer processor, producing reservoir portions in the reservoir into multiple classifications based on production data associated with the producing reservoir portions. Each classification corresponds to a range of the production data. The method further includes generating a correlation between the plurality of classifications of the producing reservoir portions to a petrophysical property and elastic property of the subterranean formation, generating, based on the correlation, a spatial distribution function of reservoir quality to represent predicted classifications as a function of physical locations in the reservoir, and evaluating, using the spatial distribution function, a physical location in the reservoir for reservoir quality.

Other aspects will be apparent from the following detailed description and the appended claims.

BRIEF DESCRIPTION OF DRAWINGS

The appended drawings illustrate several embodiments of predicting three dimensional distribution of reservoir quality and are not to be considered limiting of its scope, for predicting three dimensional distribution of reservoir production capacity may admit to other equally effective embodiments.

FIG. 1.1 is a schematic view, partially in cross-section, of a field in which one or more embodiments of predicting three dimensional distribution of reservoir production capacity may be implemented.

FIG. 1.2 shows an exploration and production modeling system in accordance with one or more embodiments.

FIGS. 3.1-3.4 depict an example for predicting three dimensional distribution of reservoir production capacity in accordance with one or more embodiments.

DETAILED DESCRIPTION

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Aspects of the present disclosure include a method, system, and computer readable medium to reduce the risk of drilling low or non-producing wells by predicting reservoir quality based on correlating rock elastic properties and petrophysical properties to existing production data.

In one or more embodiments, reservoir quality defines how much hydrocarbons are available in a reservoir and is referred to as reservoir production capacity. Further, reservoir quality may further account for a capacity to produce such hydrocarbons. For example, certain formations may have a large amount of hydrocarbons available in the formation. However, in the example, production techniques may result in not being able to obtain the large amount of hydrocarbons. In such a scenario, even though the reservoir has a large amount of hydrocarbons, reservoir quality may be low because the hydrocarbons cannot be brought to the surface and produced. Throughout this disclosure, the terms "reservoir quality" and "reservoir production capacity" may be used interchangeably.

In one or more embodiments, elastic properties and petrophysical properties are used to determine reservoir quality based on known hydrocarbon production data. In one or more embodiments, the elastic properties may be derived from seismic data and the petrophysical properties may be obtained from well logs. Specifically, embodiments may use, as input, elastic property volumes, which may be derived using prestack seismic data, well log data, and any other relevant data. One or more embodiments may be implemented for unconventional oil and gas exploration in sand/shale based reservoirs where hydrocarbons are extracted directly from source rock. Further, embodiments may be implemented for any formation type rather than or in addition to unconventional oil and gas exploration.

In one or more embodiments, portions of the reservoir are classified into sub-lithologies or sub-facies based on existing oil and/or gas production data. Each classification corresponds to a range of production data. The classifications of the producing reservoir portions are correlated to petrophysical and elastic properties of the subterranean formation. Based on the correlation, a spatial distribution function of reservoir quality is generated. The spatial distribution function may represent a predicted classification as a function of physical location in the reservoir. In other words, physical locations in the reservoir may be associated with a class defining how much production is expected from well drilled to the physical location in one or more embodiments.

In the discussion below, the classifications include high producing class, medium producing class, and low producing class. However, additional or fewer classes may be included without departing from the scope of the claims.

In one or more embodiments, generating the spatial distribution function may be based on the following. Petrophysical and elastic properties may be selected with the objective of building a relationship between hydrocarbon production capacity and elastic response of the subsurface. Further, a multi-dimensional probability density function may be generated. The multi-dimensional probability density function may be applied to the elastic property volumes, leading to the spatial distribution function of reservoir quality. Based on the reservoir quality, the production and/or drilling operations may or may not be performed and or modified. For example, if the reservoir quality indicates a low producing well, previously planned drilling or production operations may be halted or changed to a new location in the reservoir.

Figure 11:
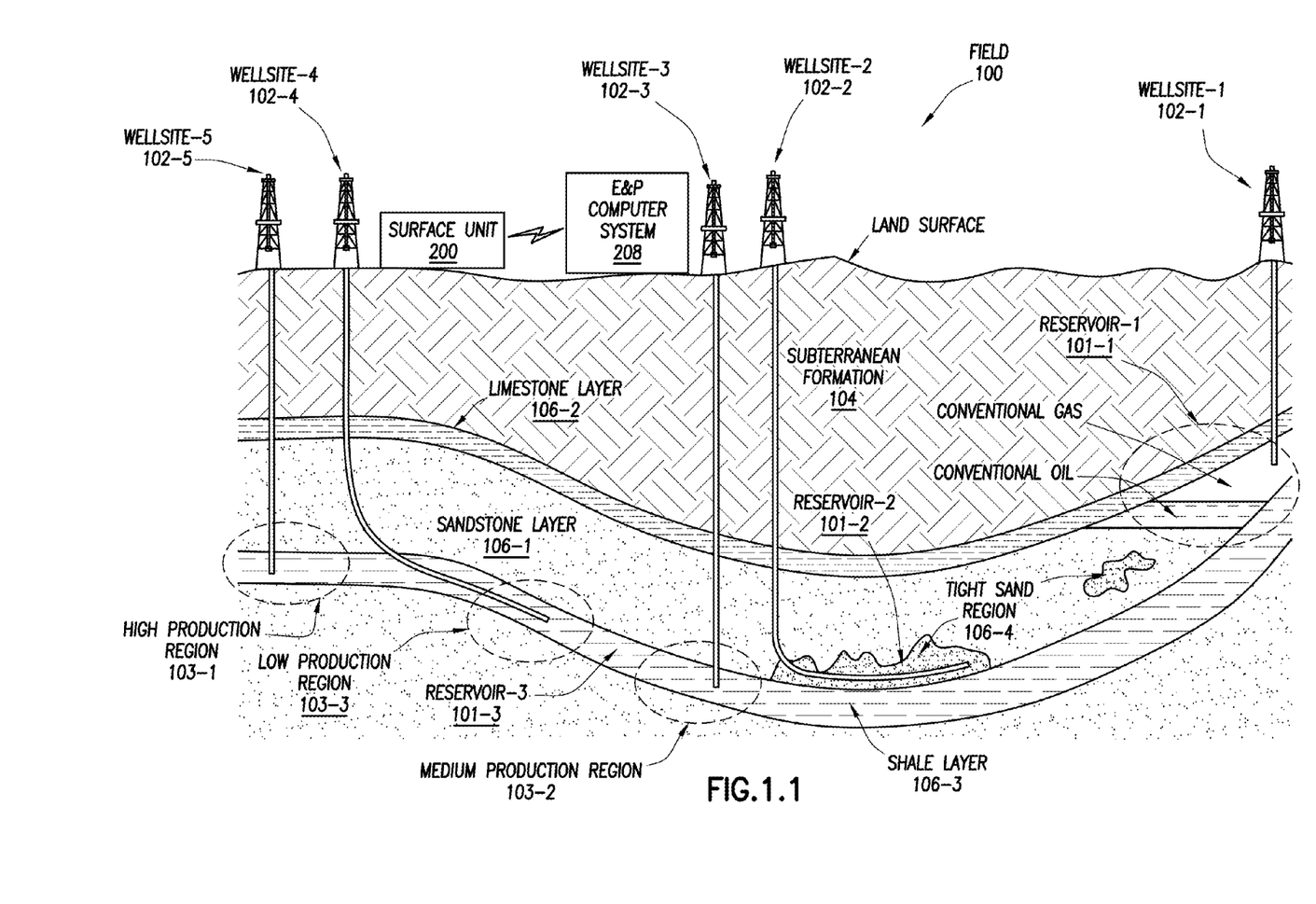

FIG. 1.1 depicts a schematic view, partially in cross section, of a field (100) in which one or more embodiments of predicting three dimensional (3D) distribution of reservoir quality may be implemented. In one or more embodiments, one or more of the modules and elements shown in FIG. 1.1 may be omitted, repeated, and/or substituted. Accordingly, embodiments of predicting 3D distribution of reservoir quality should not be considered limited to the specific arrangements of modules shown in FIG. 1.1.

As shown in FIG. 1.1, the field (100) includes various wellsites (e.g., wellsite-1 (102-1) through wellsite-5 (102-5)) with wellbores penetrating the subterranean formation (104). The subterranean formation (104) has geological structures (106-1) through (106-4), a conventional reservoir (i.e., reservoir-1 (101-1)), and unconventional reservoirs (i.e., reservoir-2 (101-2) and reservoir-3 (101-3)). As shown, the subterranean formation (104) has a sandstone layer (106-1), a limestone layer (106-2), a shale layer (106-3), and a tight sand region (106-4). The reservoir-1 (101-1) is a conventional reservoir in the sense that hydrocarbons have migrated away from source rocks (i.e., rocks where the hydrocarbons were initially formed from pre-historic organic matters) into porous regions within the sandstone layer (106-1). The reservoir-2 (101-2) and reservoir-3 (101-3) are referred to as unconventional reservoirs because hydrocarbons remain in their source rocks (e.g., the shale layer (106-3) or tight sand region (106-4)). As shown, the reservoir-3 (101-3) spans the left half of the shale layer (106-3) that is rich in hydrocarbon contents. Based on the existing production data of the wellsite-3 (102-3), wellsite-4 (102-4), and wellsite-5 (102-5), various portions (referred to as producing reservoir portions) of the reservoir-3 (101-3) have been classified as high production region (103-1), medium production region (103-2), low production region (103-3), etc. Although three classes are shown in the example depicted in FIG. 1.1, those skilled in the art with the benefit of this disclosure will appreciate that portions of the reservoir-3 (101-3) may be classified into any number of classes. In addition, many sections (referred to as not-yet-producing reservoir portions) of the reservoir-3 (101-3) remain untapped and have uncertain production potential. Throughout this disclosure, the terms "portion," "section," "zone," and "region" may be used interchangeably depending on the context.

In one or more embodiments, various survey tools and/or data acquisition tools (not shown) are disposed throughout the field (100) and adapted to measure the formation and detect the characteristics of the geological structures of the subterranean formation (104). For example, the survey/data acquisition tools may be adapted for measuring downhole properties using logging-while-drilling ("LWD") tools or measuring formation properties using seismic tools. In particular, the outputs of these various survey tools and/or data acquisition tools, as well as data derived from analyzing the outputs, are used as inputs to the workflow of predicting 3D distribution of reservoir quality. In one or more embodiments, this workflow is applied to the aforementioned untapped sections of the unconventional reservoirs (i.e., reservoir-2 (101-2) and reservoir-3 (101-3)) to identify potentially (i.e., not yet confirmed) high producing portions of these reservoirs where drilling additional wells can be justified.

Further as shown in FIG. 1.1, one or more of the wellsite-1 (102-1) through wellsite-5 (102-5) are associated with one or more surface unit (e.g., surface unit (200)) for directing field operations of the field (100). Generally, the field operations include the survey operations described above and wellbore operations, such as logging, drilling, fracturing, production, or other applicable operations performed at the wellsite-1 (102-1) through wellsite-5 (102-5).

In one or more embodiments, the surface unit (200) is operatively coupled to the aforementioned survey/data acquisition tools. In particular, the surface unit (200) is configured to communicate with the survey/data acquisition tools to send commands to the survey/data acquisition tools and to receive data therefrom. The surface unit (200) may be provided with computer facilities for receiving, storing, processing, and/or analyzing data from the survey/data acquisition tools of the field (100). The surface unit (200) may also be provided with functionality for actuating mechanisms at the field (100). The surface unit (200) may then send command signals to the field (100) in response to data received, for example to control and/or optimize various field operations described above.

In one or more embodiments, the data received by the surface unit (200) represents characteristics of the subterranean formation (104) and may include seismic data and/or information related to porosity, saturation, permeability, natural fractures, stress magnitude and orientations, elastic properties, etc. during a wellbore operation of the wellsite-1 (102-1) through wellsite-5 (102-5). For example, the data received by the surface unit (200) may be a seismic two-way response time or other type of seismic measurement data. In another example, the data received by the surface unit (200) may be a wireline log, which is a measurement of a formation property as a function of depth taken by an electrically powered instrument to infer properties and make decisions about drilling and production operations. The record of the measurements may also be referred to as a log. Measurements obtained by a wireline log may include resistivity measurements obtained by a resistivity measuring tool. In yet another example, the data received by the surface unit (200) may be a plot of a dynamic property, such as the fluid flow rate over time during production operations. Those skilled in the art with the benefit of this disclosure will appreciate that other data may also be collected, such as, but not limited to, historical data, user inputs, economic information, other measurement data, and other parameters of interest.

In one or more embodiments, the surface unit (200) is communicatively coupled to an exploration and production (E&P) computer system (208). In one or more embodiments, the data received by the surface unit (200) may be sent to the E&P computer system (208) for further analysis. Generally, the E&P computer system (208) is configured to analyze, model, control, optimize, and/or perform other management tasks of the aforementioned field operations based on the data provided from the surface unit (200). In one or more embodiments, the E&P computer system (208) is provided with functionality for manipulating and analyzing the data, such as performing seismic interpretation or borehole resistivity image log interpretation to identify geological surfaces in the subterranean formation (104) or performing simulation, planning, and optimization of field operations of the wellsite-1 (102-1) through wellsite-5 (102-5), or any part of the field (100). In one or more embodiments, the result generated by the E&P computer system (208) may be displayed for user viewing using a two dimensional (2D) display, 3D display, or other suitable displays. Although the surface unit (200) is shown as separate from the E&P computer system (208) in FIG. 1.1, in other examples, the surface unit (200) and the E&P computer system (208) may also be combined.

Figure 12:
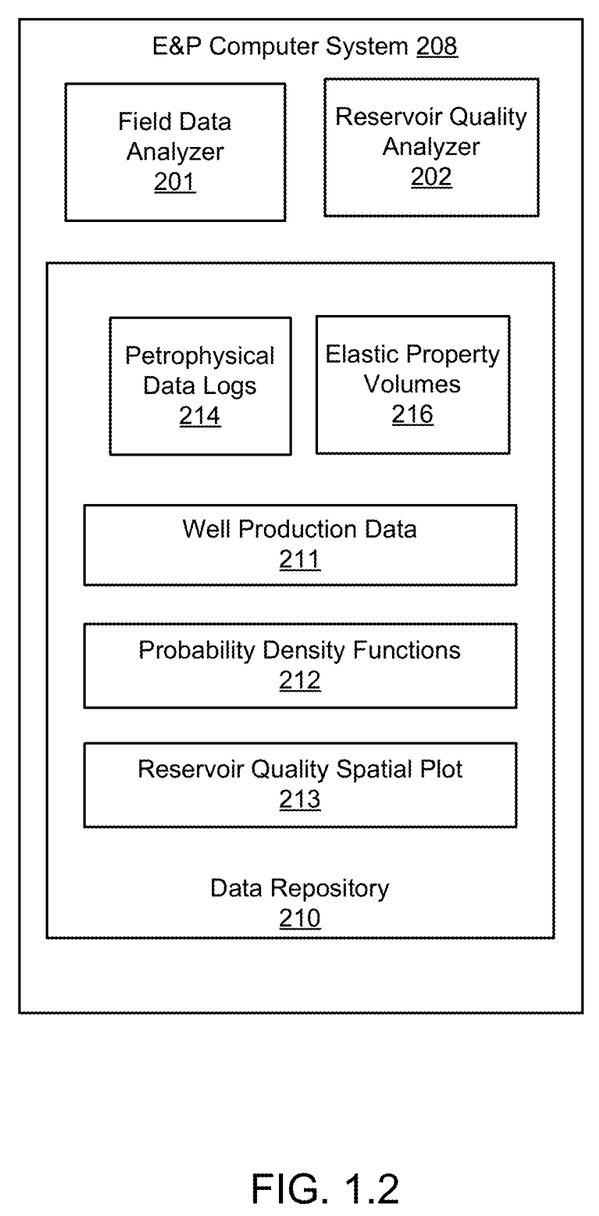

FIG. 1.2 shows additional details of the E&P computer system (208) in which one or more embodiments of predicting 3D distribution of reservoir quality may be implemented. In one or more embodiments, one or more of the modules and elements shown in FIG. 1.2 may be omitted, repeated, and/or substituted. Accordingly, embodiments of predicting 3D distribution of reservoir quality should not be considered limited to the specific arrangements of modules shown in FIG. 1.2.

As shown in FIG. 1.2, the E&P computer system (208) includes field data analyzer (201), reservoir quality analyzer (202), and data repository (210). In addition, petrophysical data logs (214), elastic property volumes (216), well production data (211), probability density functions (PDFs) (212), and reservoir quality spatial plot (213) are stored in the repository (210). Each of these elements is described below.

In one or more embodiments, the E&P computer system (208) includes the field data analyzer (201) and the reservoir quality analyzer (202) having software instructions stored in a memory and executing on a computer processor to communicate with the surface unit (202) shown in FIG. 1.1 above for receiving data therefrom and for managing (e.g., analyze, model, control, optimize, and/or perform other management tasks) the aforementioned field operations based on the received data. In one or more embodiments, the received data is stored in the data repository (210) to be processed by the field data analyzer (201) and the reservoir quality analyzer (202). One or more field operation management tasks (e.g., analysis task, modeling task, control task, optimization task, etc.) may be performed in an execution pass of the E&P computer system (208), referred to as an E&P tool session. During the E&P tool session, the received data is manipulated by the field data analyzer (201) to generate, continuously or intermittently, preliminary results. For example, the E&P tool session may be a seismic interpretation session where the field data analyzer (201) processes the seismic data set to generate interpreted seismic results. The computer processor and memory of the E&P computer system (208) are not explicitly depicted in FIG. 1.2 so as not to obscure other elements of the E&P computer system (208). An example of such computer processor(s) and memory is described in reference to FIG. 4 below.

In one or more embodiments, the reservoir quality analyzer (202) is configured to perform a workflow of predicting 3D distribution of reservoir quality. The inputs into the workflow include (i) input 1—elastic property volumes (216), (ii) input 2—well log data including petrophysical data logs (214), and (iii) input 3—well production data (211). The workflow generates probability density functions (212) and reservoir quality spatial plot (213) as intermediate and final outputs. Additional details of the workflow are described in reference to FIGS. 2-3.3 below.

In one or more embodiments, three-dimensional (3D) elastic property volumes (i.e., input 1) are obtained from seismic data. A 3D elastic property volume is formed by assigning one or more elastic property values to each of a number of bins representing physical locations throughout the reservoir. In other words, each bin represents a reservoir portion at a particular physical location in the reservoir. Example elastic properties include acoustic impedance, shear impedance, fluid factor, compressional and shear velocity ratio (Vp/Vs), density, Poisson's ratio, Young's modulus, bulk modulus, shear modulus ($\mu$), P-wave modulus, $\lambda\rho$ and $\mu\rho$ where $\rho$ represents density, $\lambda/\mu$, Lame's coefficient ($\lambda$), etc. The elastic property of formation rocks may be described by the Hook's law. As shown in TABLE 1, the shear modulus ($\mu$) and Lame's coefficient ($\lambda$) are used in Hook's law to describe the relationship between the stress and strain in the formation rocks.

TABLE 1

Hook's law $\sigma_{ij} = \lambda \partial_{ij} \epsilon_{\alpha\alpha} + 2\mu\epsilon_{ij}$
where
$\epsilon_{ij}$ = elements of the strain tensor
$\sigma_{ij}$ = elements of the stress tensor
$\epsilon_{\alpha\alpha}$ = volumetric strain
$\partial_{ij}$ = 1 if i = j, otherwise = 0
$\mu$ = Shear modulus
$\lambda$ = Lame's coefficient Both density and $\lambda/\mu$ (i.e., Lame's coefficient divided by the shear modulus) may be obtained by inverting prestack seismic data. In particular, density is the third term in the Aki and Richards reflectivity approximation, and is obtained from the far offsets. Far offsets refers to the seismic data recorded from the receivers which are farther away from the source.

In one or more embodiments, the well log data (i.e., input 2) may include sonic (compressional and shear) logs, bulk density logs, and petrophysical logs (e.g., petrophysical data logs (214)). For example, the petrophysical data logs (214) may include information regarding water saturation, porosity (effective and/or total), TOC (total organic carbon), mineral fractions (e.g., volume of clay, volume of shale, volume of silt, volume of sand, volume of coal, volume of dolomite, volume of illite, volume of calcite, etc.).

In one or more embodiments, well production data (211) (i.e., input 3) may include any production data that is relevant for classifying the reservoir based on well production. For example, 3-5 MMCF/day may be considered a medium producer zone. Anything less than 3-5 MMCF/day may be considered a low producer, and anything more than 3-5 MMCF/day may be considered a high producer in one or more embodiments. Other classifications may also be used without deviating from the scope of the present disclosure. These classes are referred to as actual production data defined classes.

In one or more embodiments, each PDF of the PDFs (212) is a function that describes the relative likelihood for a elastic property to have a given value. In one or more embodiments, the reservoir quality spatial plot (213) is generated by plotting the reservoir quality (i.e., classification) across a large number of bins representing physical locations throughout the reservoir. Specifically, a reservoir quality spatial plot (213) is a plot of a spatial distribution function of reservoir quality. For example, the reservoir quality spatial plot (213) may be a 2D plot or a 3D plot.

In one or more embodiments, the data repository (210) (and/or any of the data set, data item, annotation, etc. stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The data repository (210) may be a device internal to the E&P computer system (208). In one or more embodiments, the data repository (210) may be an external storage device operatively connected to the E&P computer system (208).

Figure 2:
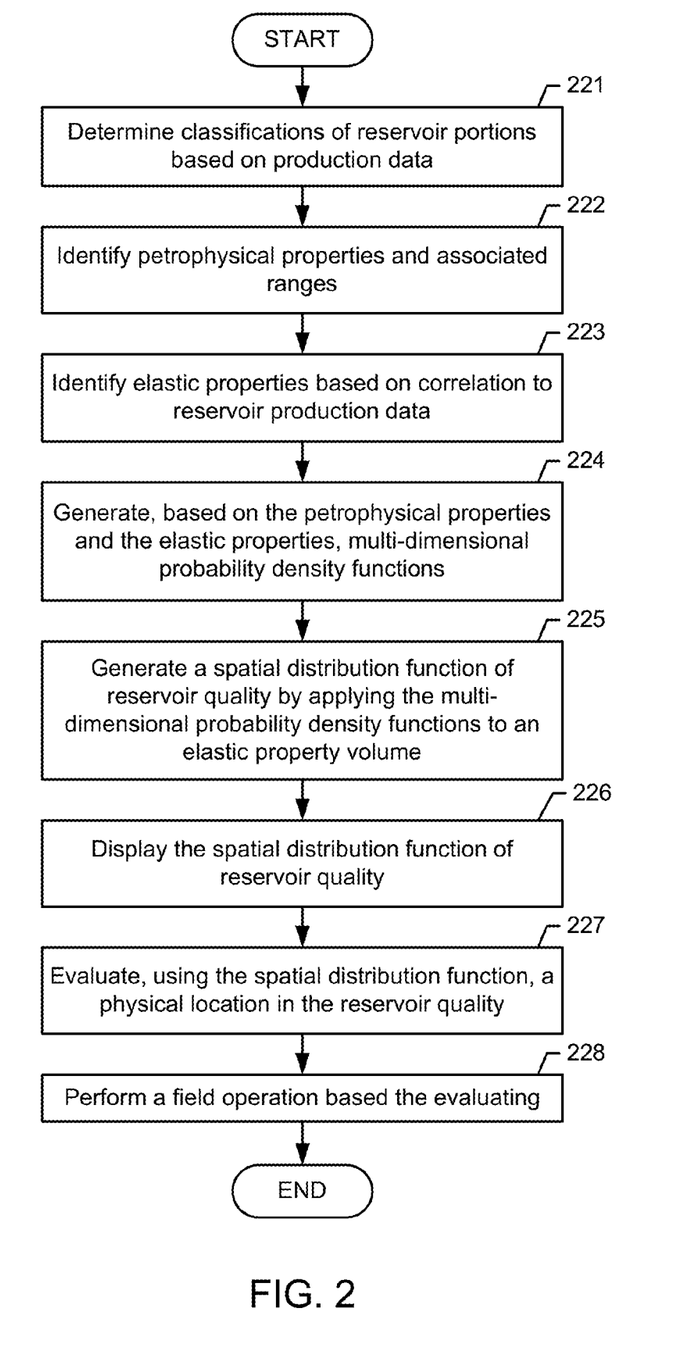
FIG. 2 shows a flow chart of a method in accordance with one or more embodiments.

FIG. 2 depicts an example flowchart of predicting 3D distribution of reservoir quality in accordance with one or more embodiments. For example, the method depicted in FIG. 2 may be practiced using the E&P computer system (208) described in reference to FIGS. 1.1 and 1.2 above. In one or more embodiments, one or more of the elements shown in FIG. 2 may be omitted, repeated, and/or performed in a different order. Accordingly, embodiments of predicting 3D distribution of reservoir quality should not be considered limited to the specific arrangements of elements shown in FIG. 2.

Initially in Block 221, production portions of the reservoir are classified into classes based on existing well production data. For example, the production portions of the reservoir may be classified into three classes (also referred to as sub-lithologies or sub-facies), referred to as high production (or high quality) zone, medium production (or medium quality) zone, and low production (or low quality) zone.

In Block 222, petrophysical properties and associated ranges are identified as correlating to reservoir quality classes (e.g., low producer, medium producer, high producer) in one or more embodiments. Specifically, certain petrophysical properties described in input 2 above are selected to be used in predicting the classification of untapped sections of the reservoir. In addition, ranges for each selected petrophysical property are determined for each of the reservoir classes based on the production portions of the reservoir. For example, Vcl, PHIE, and Sw described below may be used to separate the three classes in petrophysical domain using the example ranges listed below:

High Quality Reservoir:

$Vcl<=15\%, PHIE>=5\%, Sw<40\%$

Medium Quality Reservoir:

$15\%<Vcl<40\%, 2\%<PHIE<5\%, 40\%<Sw<65\%$

Low Quality Reservoir:

$Vcl>=40\%, PHIE<=2\%, Sw>65\%$ where Vcl is volume of clay, PHIE is effective porosity, and Sw is water saturation. In one or more embodiments, the ranges are determined empirically based on reservoir production data associated with sections of each producing well that have varying production qualities. Accordingly, these classes are referred to as petrophysical property defined classes.

In Block 223, in one or more embodiments, candidate elastic properties (e.g., AI, SI, Vp/Vs, Poisson's ratio, Lambda-rho, Mu-rho, etc.) are identified based on the correlation to reservoir production data. In particular, two or more elastic properties are selected based on correlation, within boreholes of producing wells, between the elastic response of the subsurface and reservoir production. In one or more embodiments, the selection is based on rock physics analysis (also referred to as a rock diagnosis based on cross-plotting), such as by cross-plotting reservoir production data versus candidate elastic properties within boreholes of producing wells. By way of an example, one elastic property may be on a first dimension of an example cross-plot, another elastic property may be used on a second dimension of the example cross-plot, and the reservoir quality may be on a third dimension of the example cross-plot. The reservoir quality data may be obtained from the production data of multiple sections of one or more producing wells, while the elastic properties are obtained from well logs of the corresponding sections in the producing wells or from seismic inversion output attributes at the corresponding sections in the producing wells. If, in the example, the two elastic properties generate a separation of reservoir quality into clusters in the third dimension (e.g., different reservoir qualities are partially or completely separated in the cross-plot), then the two elastic properties are selected. In one or more embodiments, in the example, if the two elastic properties do not result in a separation of the reservoir qualities into clusters in the third dimension, then different elastic properties may be tested and used. For example, the elastic properties may be on a horizontal and vertical axis as the first and second dimensions. Color of a point or another distinguishing user interface technique (e.g., using cross hatch patterns for highlighting) may be used to identify the reservoir quality for the point as the third dimension. In one or more embodiments, the reservoir qualities (e.g., in the third dimension) in the cross-plot are based on actual production data defined classes. In one or more embodiments, the reservoir qualities (e.g., in the third dimension) are indirectly represented in the cross-plot using the aforementioned petrophyiscal property defined reservoir classes. A separation and clustering may be identified if data points near each other belong to the same class whereas data points that are separated from each other belong to different classes. In one or more embodiments, cross-plotting reservoir production data (e.g., actual production data defined classes or petrophyiscal property defined reservoir classes) versus candidate elastic properties to identify well formed clusters is performed using neural network techniques, such as using self-organizing-maps (SOMs).

In one or more embodiments, the objective of Block 222 and Block 223 is to determine which elastic attributes and petrophysical property ranges best separate out the desired classes as well formed clusters in the cross-plot analysis.

Returning to FIG. 2, in Block 224, an N-dimensional probability density function (PDF) is generated based on elastic properties and petrophysical properties, where N is the number of elastic properties selected in Block 223. A PDF is a function that describes the relative likelihood for a random variable to have a given value. The probability for the random variable to fall within a particular region is defined by the integral of this variable's density over the region. The probability density function has nonnegative values, and its integral over the entire space is equal to one.

Figure 31:
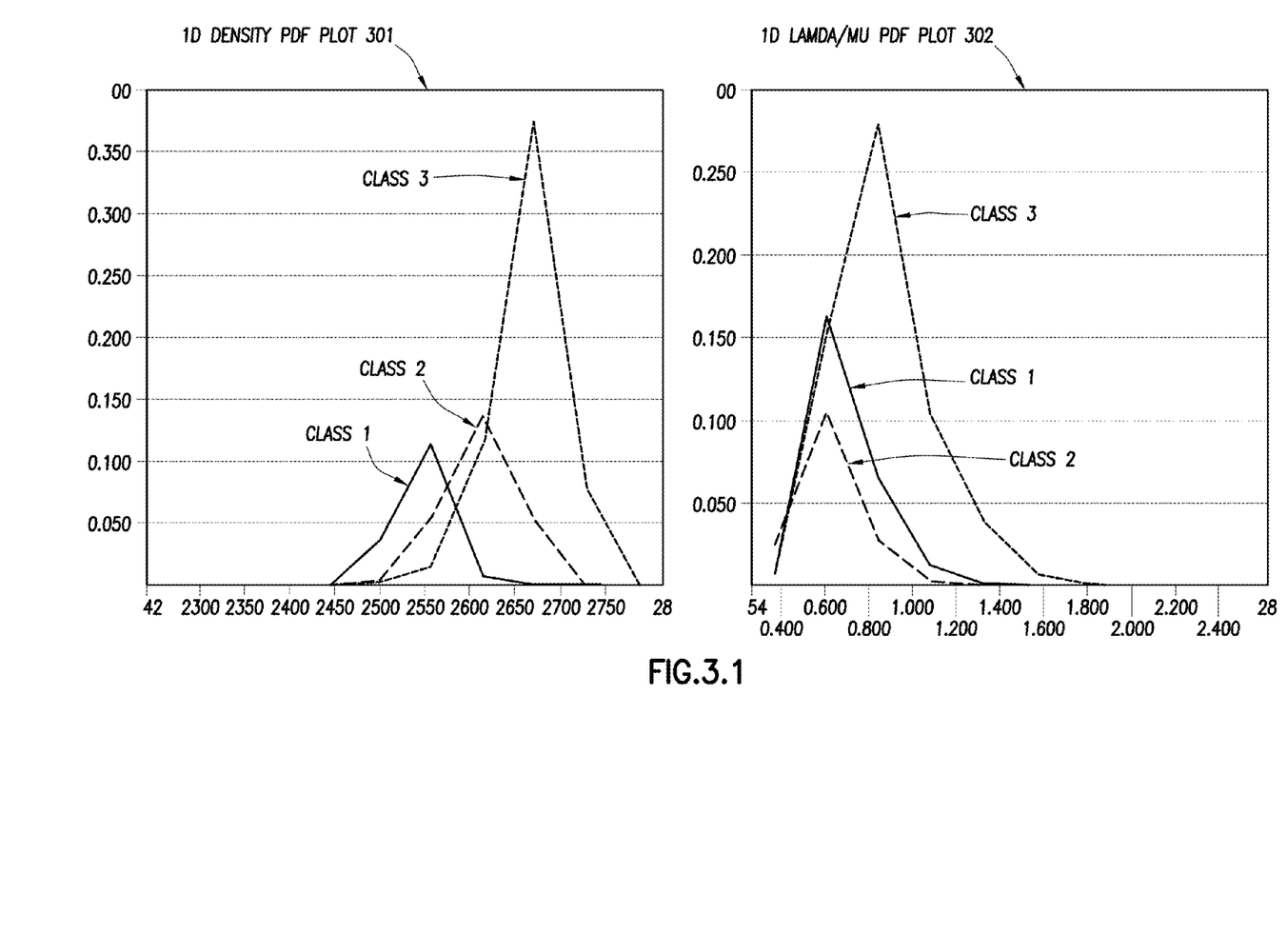

FIG. 3.1 shows an example 1D density PDF plot (301) and 1D $\lambda/\mu$ (Lamda/Mu) PDF plot (302) based on a reservoir classification of three classes. In particular, in FIG. 3.1, the curves labeled "class 1," "class 2," and "class 3" correspond to the probability (represented by the vertical axes) of the reservoir production (i.e., random variable), given the density or $\lambda/\mu$ (represented along the horizontal axes), being within each of the ranges of high production class, medium production class, and low production class.

Figure 32:
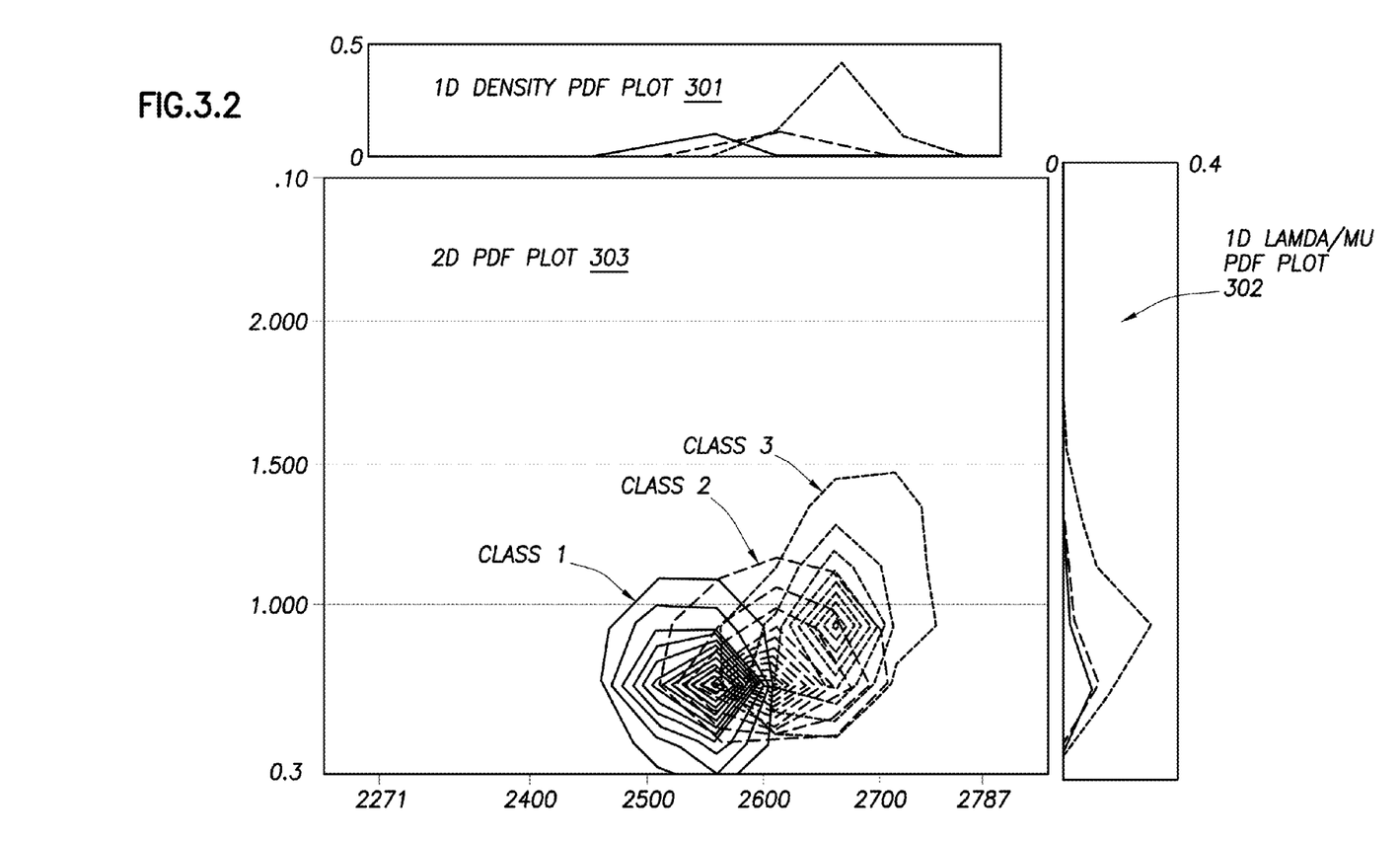

FIG. 3.2 shows example 2D PDF cross plot (303) by combining the 1D density PDF plot (301) and 1D $\lambda/\mu$ (Lamda/Mu) PDF plot (302). In particular, in FIG. 3.2, the clusters of contour lines labeled "class 1," "class 2," and "class 3" correspond to the probability of the reservoir production (i.e., random variable), given the density and, to fall into the ranges of high production class (i.e., class 1), medium production class (i.e., class 2), and low production class (i.e., class 3). Specifically, the probability is represented by values (not shown) assigned to the contour lines (shown in FIG. 3.2), the density and λ/μ are represented along the vertical and horizontal axes of the 2D PDF plot (303).

In one or more embodiments, the N-dimensional PDF is generated using Bayesian theory based on the production classification, the selected petrophysical property ranges to represent the production classes, and the elastic properties identified to best separate out the classes in cross-plots. An example methodology for solving rock physics classification problems using Bayesian decision theory is disclosed in Duda et al., 2000, "Pattern Classification," John Wiley and Sons, New York. In this example methodology, the probability of a sample in a data volume falling into a particular class x is expressed as:

$$P(C_j | x) = \frac{P(x, C_j)}{P(x)} = \frac{P(x | C_j) P(C_j)}{P(x)}$$

where P (x, Cj) is the joint probability of the sample falling into class x and Cj, P (x|Cj) denotes the conditional probability of the sample falling into class x given Cj. Cj represents one of the identified elastic properties. Other statistical methods may be used to generate an N-dimensional PDF may be used without departing from the scope of the claims.

Returning to FIG. 2, in Block 225, a spatial distribution function of reservoir quality is generated by applying the multi-dimensional probability density functions (PDFs) to elastic property volume(s) beyond the borehole of producing wells. In one or more embodiments, the PDFs are applied to the volume of density and the volume of lambda/rho. Specifically, PDFs may be applied to seismic inversion output cube(s) (also referred to as a "volume," i.e., a spatial cube volume with seismic inversion output results associated with each bin of the volume) to produce a class and probability cube. In other words, at each bin of the seismic inversion output cube, the probability of having a high/medium/low producer at the corresponding physical location in the reservoir is queried from the PDF. Specifically, the probability for a given class is obtained from the PDF using the selected elastic property values (i.e., selected in Block 223 above) in the seismic inversion output cube. Accordingly, at each bin of the spatial cube, an associated probability, which represents the likelihood of potential well production to be each of the reservoir classes, is obtained to form a class and probability cube. In other words, the probability indicates the predicted classification associated with well production if a well is drilled to access the corresponding physical reservoir location. In one or more embodiments, the class and probability cube includes a spatial distribution function of reservoir quality that represents the predicted reservoir quality (e.g., classes) as a function of a physical location in the reservoir.

Figure 33:
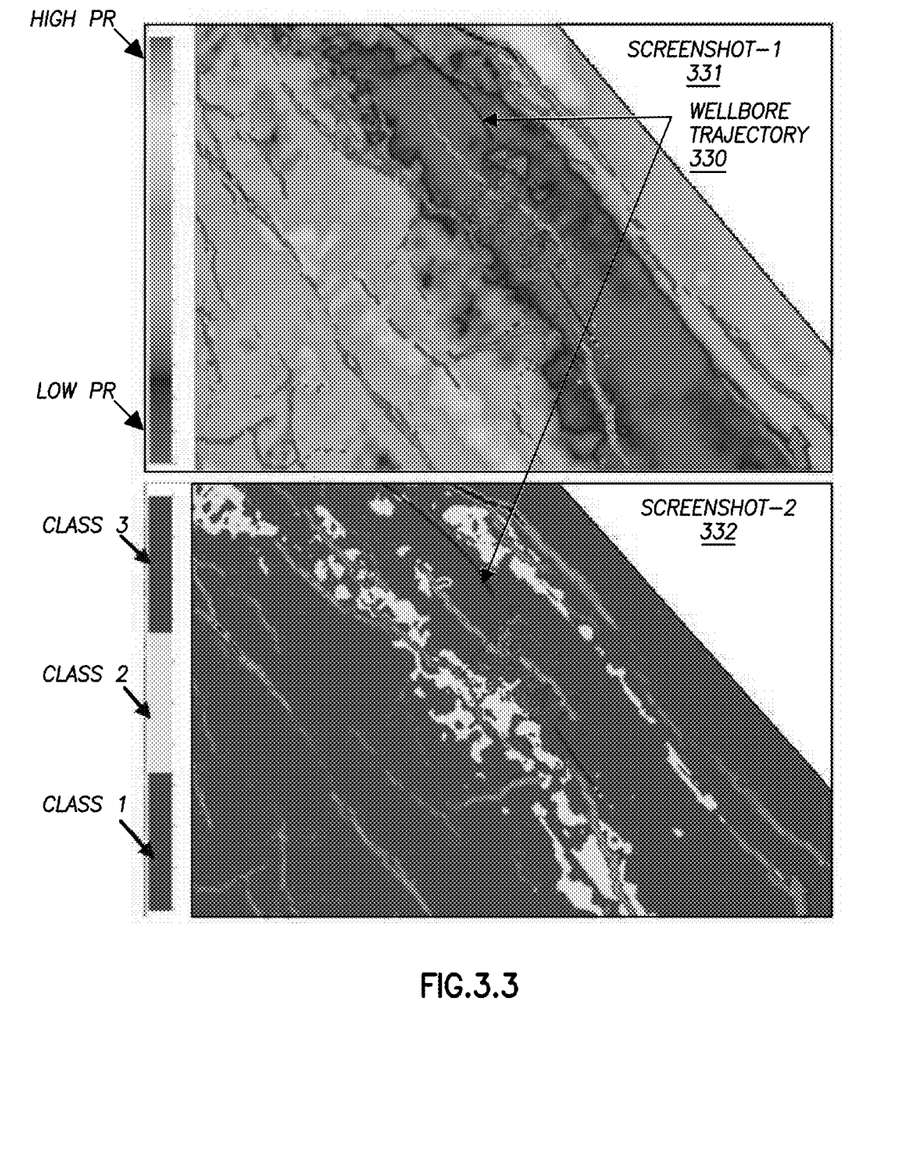

FIG. 3.3 shows a screenshot-1 (331) depicting a depth slice of a reservoir highlighted (e.g., using cross hatch patterns) according to Poisson's ratio (PR) of the rocks and a screenshot-2 (332) depicting a cross-sectional view of the same reservoir highlighted (e.g., using cross hatch patterns) according to the three reservoir classes predicted using the workflow described in FIG. 2 above. Using the classification naming convention described above, class 1, class 2, and class 3 correspond to high producing zone, medium producing zone, and low producing zone, respectively. The wellbore trajectory (330) shown in both screenshots represents the same well drilled on the principle that zones which exhibit low PR are easier to hydraulically fracture, and are therefore better producers. Although, as shown in screenshot-1 (331), the PR shows the well as being a high producing well, the well turns out to be a low producing well. In contrast, the reservoir classification result, shown in the screenshot-2 (332), indicates that the well was drilled in a class 3 zone, which indicates low-producing rock. The elastic properties for generating the PDF in this example are density and λ/μ. This combination of density and λ/μ distinguishes between high and low producing wells in one or more embodiments.

Figure 34:
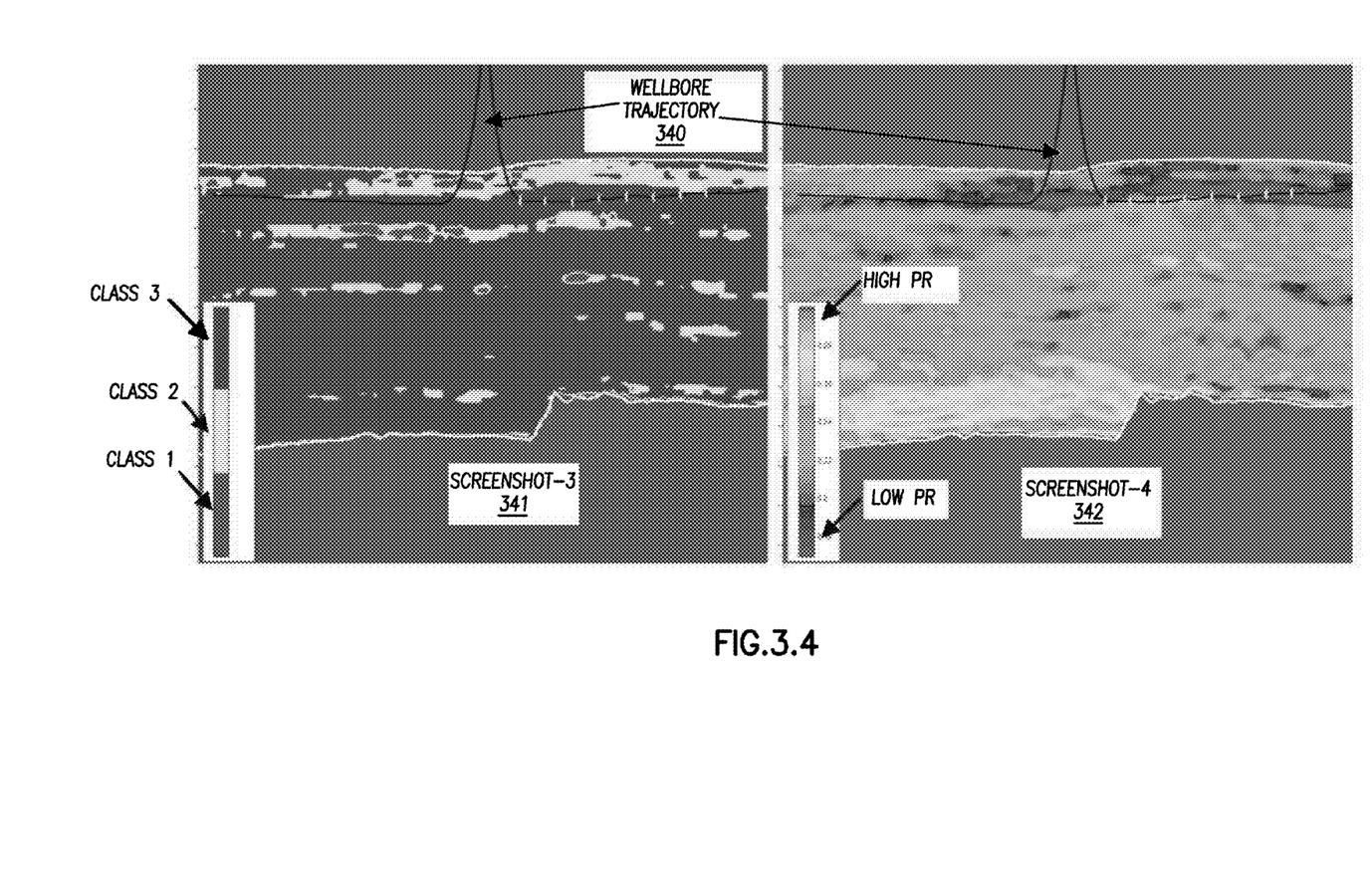

Similar to FIG. 3.3, FIG. 3.4 shows a screenshot-4 (342) depicting a cross-sectional view of another reservoir highlighted (e.g., using cross hatch patterns) according to Poisson's ratio (PR) of the rocks and a screenshot-3 (341) depicting a cross-sectional view of the same reservoir highlighted (e.g., using cross hatch patterns) according to the three reservoir classes predicted using the workflow described in FIG. 2 above. The classification naming convention of class 1, class 2, and class 3 is also adopted in FIG. 3.4. Similar to the wellbore trajectory (330) shown in FIG. 3.3, the wellbore trajectory (340) shown in both screenshots of FIG. 3.4 represents a well drilled on the principle that zones which exhibit low PR are easier to hydraulically fracture, and are therefore better producers. Although, as shown in screenshot-4 (342), the PR shows the wellbore trajectory (340) as being a high producing well, the well turns out to be a low producing well. The reservoir classification result shown in the screenshot-3 (341) indicates that the well was drilled in a class 3 zone, which indicates low-producing rock.

Returning to FIG. 2, in Block 226, spatial distribution function of reservoir quality is displayed to a user in one or more embodiments. For example, in one or more embodiments, after the E&P computer system, surface unit, or other electronic device performs one or more of Blocks 201-205, the spatial distribution function may be displayed on a display device. The spatial distribution function may be displayed as a reservoir quality spatial plot in one or more embodiments. Examples of the reservoir quality spatial plot are shown in FIGS. 3.3 and 3.4 as the screenshot-2 (332) and screenshot-3 (341), respectively.

In Block 227, using the spatial distribution function, a physical location in the reservoir is evaluated for reservoir quality. For example, evaluating the physical location may include selecting a physical location that is shown in the spatial distribution function as being high producing. By way of another example, a previously selected location may be analyzed to determine the class of the previously selected location as presented in the spatial distribution function.

In Block 228, a field operation is performed based at least on the evaluating in accordance with one or more embodiments. In other words, the field operation is performed with regard to a particular physical location in the reservoir based at least on the predicted classification of the particular physical location. In one or more embodiments, the field operation includes one or more of survey operation, field planning, wellbore operation, and other applicable operations that may be performed at the field. In particular, the wellbore operation includes logging, drilling, completion, fracturing, production, or other applicable operations performed at the wellsite. For example, one or more of the drilling, completion, fracturing, and production operations may or may not be performed with regard to the particular physical location, depending on whether the particular physical location is predicted to be a high producing zone, a medium producing zone, or a low producing zone according to the predicted classification. In one or more embodiments, the field operation may be performed in a variety of ways including automatically (i.e. without human intervention), manually, combinations thereof, or other ways. For example, the filed operation may be performed automatically based at least on the predicted classification of the particular physical location.

Figure 4:
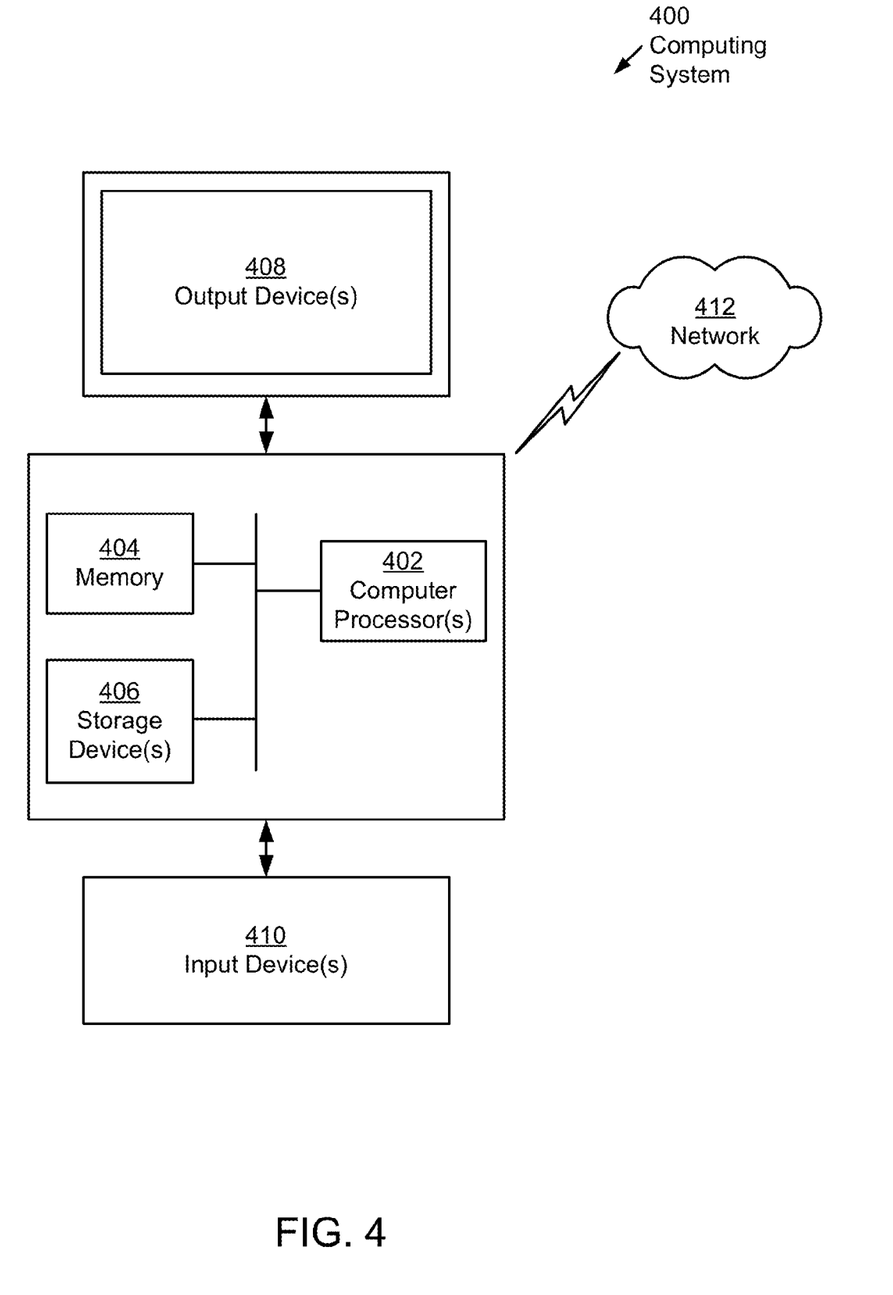
FIG. 4 depicts a computer system using which one or more embodiments of predicting three dimensional distribution of reservoir production capacity may be implemented.

Embodiments of predicting three dimensional distribution of reservoir quality may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of predicting three dimensional distribution of reservoir quality. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of predicting three dimensional distribution of reservoir quality may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of predicting three dimensional distribution of reservoir quality.

Further, one or more elements of the aforementioned computing system (400) may be located at a remote location and connected to the other elements over a network (414). Further, embodiments of predicting three dimensional distribution of reservoir quality may be implemented on a distributed system having a plurality of nodes, where each portion of predicting three dimensional distribution of reservoir quality may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

The systems and methods provided relate to the extraction of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While predicting 3D distribution of reservoir quality has been described with respect to a limited number of embodiments, those skilled in the art, having benefit of this disclosure, will appreciate that other embodiments may be devised which do not depart from the scope of predicting 3D distribution of reservoir quality as disclosed herein. Accordingly, the scope of predicting 3D distribution of reservoir quality should be limited only by the attached claims.

What is claimed is:

1. A method for evaluating portions of a reservoir, comprising:
    classifying, by a computer processor, producing reservoir portions in the reservoir into a plurality of classifications based on production data associated with the producing reservoir portions, wherein each classification of the plurality of classifications corresponds to a range of the production data;
    generating a correlation between the plurality of classifications of the producing reservoir portions to a petrophysical property and elastic property of the subterranean formation;
    generating, by the computer processor and based on the correlation, a spatial distribution function of reservoir quality to represent predicted classifications as a function of physical locations in the reservoir; and
    evaluating, using the spatial distribution function, a physical location in the reservoir for reservoir quality.

2. The method of claim 1, further comprising:
    displaying the spatial distribution function.

3. The method of claim 1, further comprising:
    performing a field operation based on evaluating the physical location.

4. The method of claim 1, further comprising:
    selecting the petrophysical property and the elastic property for the spatial distribution function based on the correlation to the production data.

5. The method of claim 3, further comprising:
    generating, by the computer processor, a multi-dimensional probability density function corresponding to a classification of the plurality of classifications,
    wherein the multi-dimensional probability density function represents probability of predicted production data of a not-yet-producing reservoir portion being classified as the classification if the not-yet-producing reservoir portion is drilled for production, and
    wherein the probability is represented as a function of the petrophysical properties and the elastic properties of the not-yet-producing reservoir portion.

6. The method of claim 5, wherein the spatial distribution function is generated by applying the multi-dimensional probability density function to an elastic property volume.

7. The method of claim 6, wherein the elastic property volume comprises values of the elastic property assigned to physical locations in the reservoir.

8. The method of claim 1, wherein the elastic property comprise density and a ratio of Lame's coefficient over shear modulus.

9. A system for evaluating portions of a reservoir, comprising:
- a computer processor and memory;
- a reservoir quality analyzer having instructions stored in the memory, executing on the computer processor, and configured to:
  - classify producing reservoir portions in the reservoir into a plurality of classifications based on production data associated with the producing reservoir portions, wherein each classification of the plurality of classifications corresponds to a range of the production data;
  - generate a correlation between the plurality of classifications of the producing reservoir portions to a petrophysical property and elastic property of the subterranean formation;
  - generate, based on the correlation, a spatial distribution function of reservoir quality to represent predicted classifications as a function of physical locations in the reservoir; and
  - evaluate, using the spatial distribution function, a physical location in the reservoir for reservoir quality; and
- a repository configured to store the spatial distribution function of the reservoir quality.

10. The system of claim 9, further comprising:
a display device configured to display the spatial distribution function of reservoir quality.

11. The system of claim 10, wherein a field operation is performed based on evaluating the physical location.

12. The system of claim 9, wherein the instructions, when executed, are further configured to:
select the petrophysical property and the elastic property for the spatial distribution function based on the correlation to the production data.

13. The system of claim 10, wherein the instructions, when executed, are further configured to:
generate a multi-dimensional probability density function corresponding to a classification of the plurality of classifications,
wherein the multi-dimensional probability density function represents probability of predicted production data of a not-yet-producing reservoir portion being classified as the classification if the not-yet-producing reservoir portion is drilled for production, and
wherein the probability is represented as a function of the petrophysical properties and the elastic properties of the not-yet-producing reservoir portion.

14. The system of claim 13, wherein the spatial distribution function of reservoir quality is generated by applying the multi-dimensional probability density function to an elastic property volume.

15. The system of claim 14, further comprising:
a field data analyzer configured to generate the elastic property volume based on prestack seismic data,
wherein the elastic property volume comprises values of the elastic property assigned to physical locations in the reservoir.

16. The system of claim 9, wherein the elastic property comprise density and a ratio of Lame's coefficient over shear modulus.

17. A non-transitory computer readable medium storing instructions for evaluating portions of a reservoir, the instructions, when executed by a computer processor comprising functionality for:
classifying producing reservoir portions in the reservoir into a plurality of classifications based on production data associated with the producing reservoir portions, wherein each classification of the plurality of classifications corresponds to a range of the production data;
generating a correlation between the plurality of classifications of the producing reservoir portions to a petrophysical property and elastic property of the subterranean formation;
generating, based on the correlation, a spatial distribution function of reservoir quality to represent predicted classifications as a function of physical locations in the reservoir; and
evaluating, using the spatial distribution function, a physical location in the reservoir for reservoir quality.

18. The non-transitory computer readable medium of claim 17, wherein the instructions, when executed, further comprising functionality for:
displaying the spatial distribution function of reservoir quality.

19. The non-transitory computer readable medium of claim 17, wherein the instructions, when executed, further comprising functionality for:
performing a field operation based on evaluating the physical location.

20. The non-transitory computer readable medium of claim 17, wherein the instructions, when executed, further comprising functionality for:
selecting the petrophysical property and the elastic property for the spatial distribution function based on the correlation to the production data.

21. The non-transitory computer readable medium of claim 17, wherein the instructions, when executed, further comprising functionality for:
generating a multi-dimensional probability density function corresponding to a classification of the plurality of classifications,
wherein the multi-dimensional probability density function represents probability of predicted production data of a not-yet-producing reservoir portion being classified as the classification if the not-yet-producing reservoir portion is drilled for production, and
wherein the probability is represented as a function of the petrophysical properties and the elastic properties of the not-yet-producing reservoir portion.

22. The non-transitory computer readable medium of claim 21, wherein the spatial distribution function of reservoir quality is generated by applying the multi-dimensional probability density function to an elastic property volume.

23. The non-transitory computer readable medium of claim 22, wherein the elastic property volume comprises values of the elastic property assigned to physical locations in the reservoir.

24. The non-transitory computer readable medium of claim 17, wherein the elastic property comprise density and a ratio of Lame's coefficient over shear modulus.

* * * * *